United States Patent [19]

Sirovich

[11] 4,200,144
[45] Apr. 29, 1980

[54] HYDRIDE HEAT PUMP

[75] Inventor: Bruce E. Sirovich, Naperville, Ill.

[73] Assignee: Standard Oil Company (Indiana), Chicago, Ill.

[21] Appl. No.: 802,800

[22] Filed: Jun. 2, 1977

[51] Int. Cl.² ............................................. A28D 15/00
[52] U.S. Cl. ................................... 165/1; 165/107 R; 165/DIG. 17
[58] Field of Search .................... 165/1, 107, DIG. 17

[56] References Cited

U.S. PATENT DOCUMENTS

| | | | |
|---|---|---|---|
| 3,943,719 | 3/1976 | Terry et al. | 60/644 |
| 4,039,023 | 8/1977 | McClaine | 165/DIG. 17 |
| 4,040,410 | 8/1977 | Libowitz | 126/270 |
| 4,044,819 | 8/1977 | Cottingham | 165/1 |
| 4,055,962 | 11/1977 | Terry | 60/644 X |
| 4,085,590 | 4/1978 | Powell et al. | 60/673 |
| 4,111,002 | 9/1978 | Van Mal et al. | 62/647 R |

OTHER PUBLICATIONS

Gruen et al., "A Thermodynamic Analysis of HYCSOS, A Hydrogen Conversion and Storage System", Conference Proceedings, vol. II, 1st World Hydrogen Energy Conference, Miami Beach, Fla., Mar. 1-3, 1975, pp. 8B-73 to 8-B87.

Miller et al., JPL Invention Report 30-3180/-NPO-13510, Jet Propulsion Laboratory, Calif. Institute of Technology, Pasadena, Calif., Mar. 1977, Ten pages.

Gruen et al., "Metal Hydride Systems for Solar Energy Storage and Conversion", Proceedings of the Workshop on Solar Energy Subsystems for Heating and Cooling of Buildings, Charlottesville, Va., Apr. 16-18, 1975, pp. 97 to 99.

*Primary Examiner*—Leland A. Sebastian
*Attorney, Agent, or Firm*—Ronald C. Petri; William T. McClain; William H. Magidson

[57] ABSTRACT

Hydrides are used as a means to pump heat from a low grade thermal source, using hydrogen and materials which reversibly and exothermically form hydrides therewith at low temperatures and pressures, and which reversibly dehydride to release large quantities of hydrogen at relatively higher temperatures and pressures, which hydrogen then exothermically recombines with a second hydride species, thereby pumping heat from a given temperature to a higher temperature.

8 Claims, 6 Drawing Figures

SCHEMATIC OF SIMPLE HYDRIDE HEAT-PUMP CYCLE

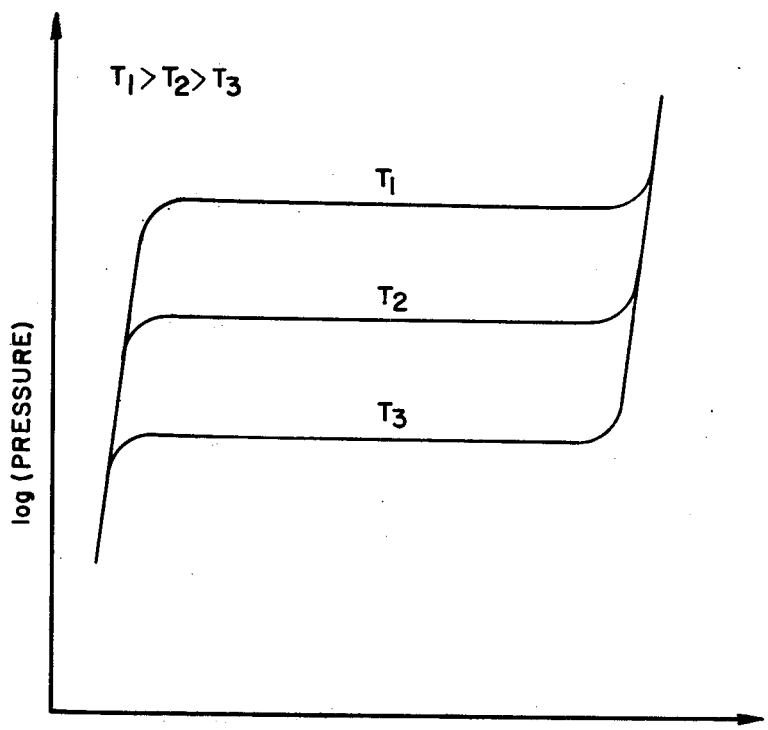
FIG. 1 TYPICAL PRESSURE-COMPOSITION ISOTHERMS
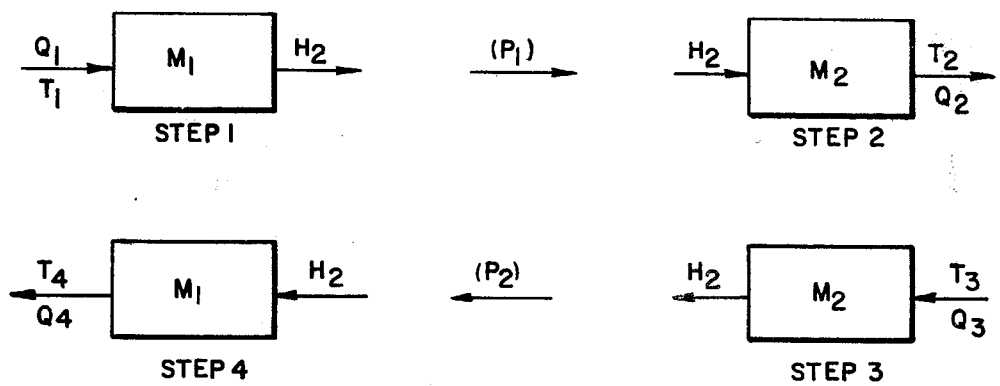
SCHEMATIC OF SIMPLE HYDRIDE HEAT-PUMP CYCLE
FIG. 2

PRESSURE-COMPOSITION ISOTHERMS FOR SIMPLE HYDRIDE HEAT PUMP CYCLE

TYPICAL HYSTERESIS EFFECTS IN HYDRIDE SYSTEMS

HYDRIDE HEAT PUMP

BACKGROUND OF THE INVENTION

1. Field of the Invention

This invention relates to heat pumps as a method of extracting heat from one or more energy sources at a low temperature and delivering thermal energy for use at a higher temperature. More specifically, this invention relates to the use of hydrides as a means to pump heat from a low grade thermal source, using hydrogen and materials which reversibly and exothermically form hydrides therewith at low temperatures and pressures, and which reversibly dehydride to release large quantities of hydrogen at relatively higher temperatures and pressures, which hydrogen then exothermically recombines with a second hydride species, thereby pumping heat from a given temperature to a higher temperature. The hydrogen source which drives this hydride-dehydride cycle by supplying relatively high prssure hydrogen and drawing off relatively low pressure hydrogen may also employ hydrides.

2. Description of the Prior Art

Various types of heat-pumps have been proposed to accomplish the task of causing heat to flow from an energy reservoir of a given temperature to a reservoir at a higher temperature. A large amount of relatively low temperature thermal energy is wasted in the operation of many power plants and other systems that generate power. While some of these low temperature sources may be suitable for space heating, much of these sources are not used efficiently because they are at temperatures too low for efficient useful application. A heat pump which could extract heat from a low grade source and efficiently deposit heat at a higher temperature would therefore be desirable.

The ability of hydrides to chemically store hydrogen in a concentrated form at a relatively low temperature and pressure, and then to release the hydrogen at an elevated temperature and pressure, has been recognized and numerous hydride forming materials have been identified. Recently, the properties of various metal hydrides for potential use in power and refrigeration systems have received considerable attention.

In U.S. Pat. No. 3,508,414 to Wiswall and Reilly, a method of storing hydrogen is described in which gaseous hydrogen is absorbed by titanium-iron alloys. When such a hydride containing 2 weight percent hydrogen is maintained at a temperature of 25° C., hydrogen is released at a constant rate until less than 1.0 weight percent of the hydrogen remains in hydride form. In U.S. Pat. No. 3,315,479 to Wiswall and Reilly, a method of storing hydrogen by formation of nickel-magnesium hydride is discussed. Similar formation of copper-magnesium hydrides is discussed in U.S. Pat. No. 3,375,676, issued to the same patentees. In U.S. Pat. No. 3,516,263, Wiswall and Reilly further discuss the formation of titanium-iron hydrides, and point out that a particular type of pressure vessel may be used to contain the hydride, and to heat the hydride to develop hydrogen pressures exceeding 10,000 psi.

By alternating the formation and decomposition of the metal hydride, workers at the Brookhaven National Laboratory have proposed, in Report No. 15844, April, 1971, to use the alternate decomposition and regeneration of the hydride as a gas circulation pump. Such systems have also been proposed for refrigeration.

More recently, in U.S. Pat. No. 3,504,494, a closed cycle method for intermittently producing high energy steam has been described, and U.S. Pat. No. 3,943,719 describes a method of developing shaft power by chemically compressing hydrogen in a hydride-dehydride-hydrogen cycle below 450° F.

The use of hydrides in heat pump applications has recently been explored by Cottingham in U.S. patent application Ser. No. 657,519, filed Feb. 12, 1976 under the auspices of the Energy Research and Development Administration. Cottingham employs hydrides to extract heat energies from a high temperature driving source and a low temperature source to deliver heat to a common load at an intermediate temperature. In particular, Cottingham's pump operates, for example, between sources at 175° C. and 13° C. to deliver heat energy to a common 60° C. load.

This review of prior art is significant in its lack of art which is capable of delivering heat energy, without mechanical assistance, to a load at a temperature greater than any source or input temperature. In addition, the art does not contemplate the use of hydrides to obtain high pressure conditions which can then be utilized to pump heat over a temperature range which, in principle, is independent of the temperatures over which the hydride pressure pumping occurs.

SUMMARY OF THE INVENTION

This invention provides a means by which a cycle with few or no moving parts is employed to pump heat from low temperature heat source to a high temperature load using materials that reversibly and exothermically form hydrides with hydrogen. A first species of hydridable material is hydrided in a suitable hydride-dehydride reactor and heated to temperature $T_1$, thereby releasing hydrogen. A second species of hydridable material in a second hydride-dehydride reactor then exothermically absorbs this hydrogen thereby delivering heat at temperature $T_2$. Thereafter, the cycle is reversed wherein the second species is dehydrided at $T_3$ to release hydrogen as the first species absorbs hydrogen and releases heat to ambient or a cooling medium at $T_4$. Suitable choices of the paired hydridable species can be made such that $T_1 > T_4$, $T_2 > T_3$, and most significantly, the load temperature, $T_2$, is higher than all three other temperatures, $T_1$, $T_3$, and $T_4$.

In addition, such a cycle can be used in conjunction with a process in which hydridable materials are used to supply chemically compressed high pressure hydrogen while operating over a temperature range, $T_a$–$T_b$, which is characteristic of the hydride selected. This high pressure hydrogen is then employed with another hydride to pump heat over a range, $T_c$–$T_d$, which in principle, is independent of $T_a$ and $T_b$. Thus, this invention can deliver heat at a temperature higher than any source employed ($T_d > T_c$, $T_b$, and $T_a$) as well as, for example, perform cryogenic refrigeration to extract heat from very low temperature sources ($T_c > T_d$, $T_a$, and $T_b$). The dynamic range of the heat pumping ($T_c$–$T_d$) is dependent only upon the choice of hydride species and may bear no relationship to the range over which the driving force operates ($T_a$–$T_b$).

BRIEF DESCRIPTION OF THE DRAWINGS

FIG. 1 is a schematic diagram of typical pressure-composition isotherms for a hydride system.

FIG. 2 is a schematic representation of the first embodiment of this invention.

DETAILED DESCRIPTION OF THE INVENTION

Principles Involved

Figure 3:
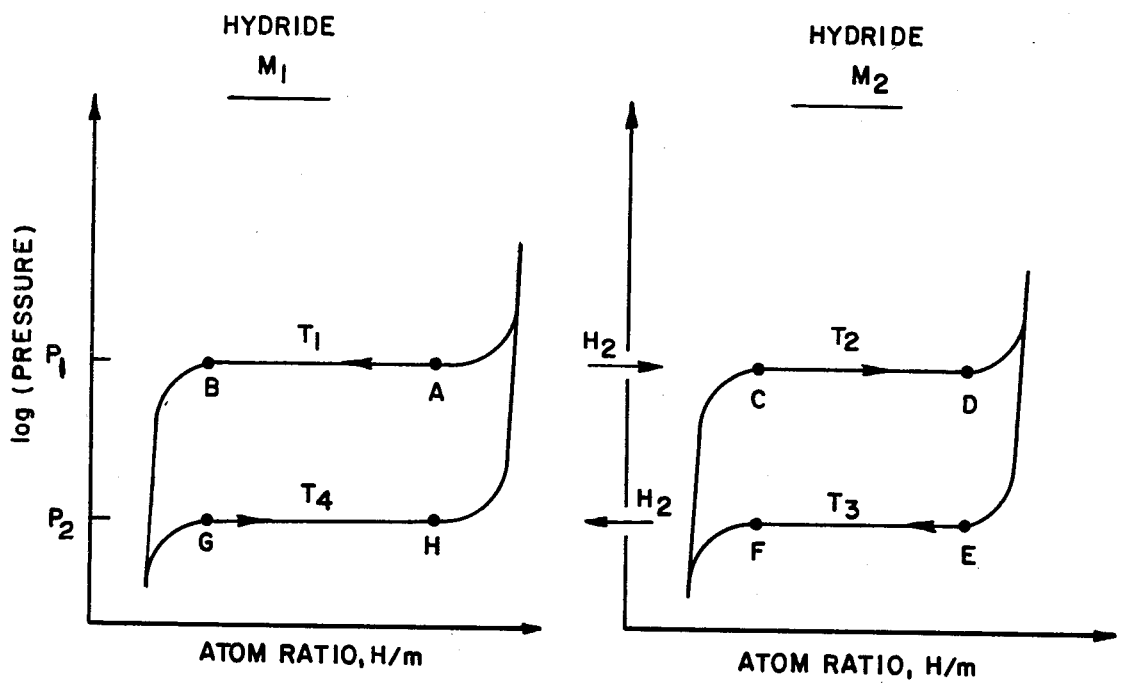
FIG. 3 is a pair of schematic diagrams representing the pressure-composition curves for the system of FIG. 2.

The compounds employed in this invention possess the capability of forming hydrides when exposed to hydrogen while maintained at a temperature lower than the decomposition temperature at a given pressure. The decomposition temperature of any hydride at a given pressure is regarded as the characteristic temperature above which the hydride begins to decompose, liberating the absorbed hydrogen. The decomposition temperature of a hydride rises as the pressure rises.

For a number of pure metals and metal alloys it is possible to store large quantities of hydrogen in the metallic lattice. The hydrogen storage capacity for any hydride may be expressed as the atom ratio, H/m, where H is the number of hydrogen atoms and m is the number of metal atoms. In addition, some hydride formers are endothermic while others are exothermic. The substances of primary interest are also those that are exothermic absorbers of hydrogen. For these, appreciable quantities of heat are liberated as the metal absorbs hydrogen. Finally, the most useful metals are those that maintain almost constant pressure conditions during the hydriding or dehydriding cycle at constant temperature. Thus, the preferred hydridable materials for use in this invention are those that are capable of attaining large values of H/m while exothermically absorbing hydrogen and, for a given temperature, are substantially isobaric for a large range of H/m values. Materials which are suitable for use include, but are not limited to, nickel-magnesium alloys, niobium metal, vanadium metal, lanthanum-nickel compounds, calcium-nickel, scandium metal, iron-titanium compounds, iron-titanium-nickel compounds, and titanium-nickel compounds.

A diagram of generally typical isotherms for a hydride useful in this invention is shown in FIG. 1. It can be seen that these hydrides possess isobaric equilibrium regions in which H/m increases while the pressure is substantially constant for a given temperature. Substances most useful in this invention remain substantially isobaric for a range of H/m greater than 0.25. In short, the flat plateau regions of FIG. 1 are preferably wider than 0.25 in H/m. With respect to the characteristic response of hydridable materials to exposure to hydrogen gas under varying conditions of temperature and pressure, the relationship of the equilibrium pressure to the equilibrium temperature at which a particular hydride will exist in commonly empirically found to obey the equation $$\log P_{eq.} = -(A/T_{eq}) + B$$

where $P_{eq.}$ is the equilibrium pressure of the hydrogen in atmospheres, $T_{eq.}$ is the corresponding equilibrium temperature in degrees Kelvin, A is a constant with dimensions of temperature, and B is a constant without dimensions. On the basis of the specified equation, which is characteristic of materials which undergo hydriding to an equilibrium state upon exposure to hydrogen gas, the preferred hydridable materials for use in the present invention can be determined. Different substances are known to exhibit different constants A and B in this equation. It is this fact that allows the utilization of such substances in combination for heat pumping schemes. The range of H/m where the pressure is relatively constant is a very useful characteristic and is typical of many, though not all, of the hydride formers.

The Heat Pump

The hydride heat pumping device is depicted in its simplest configuration in FIG. 2. With reference to FIG. 2, $M_1$ and $M_2$ are two different hydride species contained in separate hydride-dehydride reactors. The heat quantity either added or given off by the pump at various stages in the 4-step cycle is designated as $Q_1$, $Q_2$, $Q_3$, or $Q_4$ while the temperatures at which this heat transfer occurs are designated $T_1$, $T_2$, $T_3$, and $T_4$, respectively. The pressures of the liberated hydrogen are denoted $P_1$ and $P_2$.

FIG. 3 depicts the pressure-composition curves, also known as absorption curves, corresponding to the schematic of FIG. 2 for the two hydride beds $M_1$ and $M_2$. For clarity in FIG. 3, the absorption curves for the two different hydride systems, $M_1$ and $M_2$, share a common pressure axis. In the operation of this invention, bed $M_1$ is initially nearly fully hydrided, corresponding to the high H/m value of point A on the absorption curve for $M_1$ in FIG. 3. This hydride bed is then heated to a temperature $T_1$, which is above the decomposition temperature of $M_1$ for pressure $P_1$. The stored hydrogen is driven off at characteristic pressure $P_1$. As the H/m value decreases, $M_1$ travels along its characteristic absorption curve toward point B, as noted by the arrow on the curve of FIG. 3. absorbs hydrogen at pressure $P_1$. Initially bed $M_2$ is dehydrided, or as hydrogen free as possible, corresponding to point C on its absorption curve in FIG. 3. When placed in contact with the hydrogen liberated by $M_1$ at pressure $P_1$, $M_2$ begins to exothermically absorb hydrogen and the temperature of the $M_2$ bed begins to rise to $T_2$. As more hydrogen is absorbed by $M_2$, its H/m ratio increases, driving $M_2$ along its absorption curve toward point D, as noted by the arrow in FIG. 3.

This process continues until either $M_1$ is substantially depleted of stored hydrogen or $M_2$ is substantially saturated—conditions corresponding in FIG. 3 to points B and D, respectively. At this point, the temperatures of both beds are dropped: $M_1$ is brought to temperature $T_4$; $M_2$ is brought to temperature $T_3$. Dropping the temperature of $M_2$ places the bed on the second curve at point E of the absorption curve of FIG. 3. At $T_3$, $M_2$ releases the absorbed hydrogen at a pressure $P_2$, thereby decreasing the H/m ratio and moving along the $M_2$ absorption curve toward point F. Simultaneously, the hydrogen at $P_2$ is brought into contact with bed $M_1$ which absorbs hydrogen at this pressure when at temperature $T_4$. This absorption raises the H/m ratio, and $M_1$ moves along the curve in FIG. 3 toward point H. When depletion of $M_2$, or saturation of $M_1$ occurs, then $M_1$ can again be heated to $T_1$ and the cycle repeated.

Certain relationships among the physical parameters of this cycle can be noted. The pressure $P_1$ delivered by $M_1$ is greater than the pressure $P_2$ at which $M_2$ releases the hydrogen and, in general, $T_2$ is greater than $T_3$ and $T_1$ is greater than $T_4$. More important, however, is the fact that the quantity of heat $Q_1$ is primarily a function of the particular hydride species $M_1$, and the upper temperature $T_1$ of the $M_1$ cycle is essentially a function of the desorption pressure $P_1$ and the hydride species $M_1$. Similarly, the amount of heat $Q_2$, at temperature $T_2$, delivered to a load on $M_2$ is essentially a function of the particular species of hydride $M_2$ selected. Therefore, when a hydride in this invention is maintained at a particular temperature, it will absorb or draw hydrogen gas if the hydrogen supplied is above a corresponding pressure which is principally a characteristic of the material and the temperature. When the temperature of this same material is raised, it will desorb this hydrogen gas so long as the pressure over the material remains below a corresponding characteristic pressure which is likewise dependent principally upon the material and the new temperature. On the other hand, when a nearly depleted hydride in this invention is exposed to hydrogen above a particular relatively high pressure, it will exothermically absorb or draw the hydrogen and heat up to, or supply heat energy at, a corresponding characteristic temperature which is dependent principally upon the material and the absorption pressure. Similarly, when hydrided material is exposed to relatively low pressure hydrogen, or some mechanism is used to draw hydrogen from the bed, then the hydride will respond by desorbing hydrogen if heat energy is supplied from a heat source above a corresponding characteristic temperature, which is again dependent principally upon the material and the desorption pressure.

It can be observed, therefore, the $M_1$ functions primarily as a driving bed to furnish hydrogen at sufficiently high pressure $P_1$ to enable the working bed $M_2$ to absorb the hydrogen at an elevated temperature $T_2$ and thereby deliver thermal energy. Thus, the temperatures between which the pressure source bed $M_1$ operates ($T_1$-$T_4$), bear little relationship to the temperatures between which $M_2$ pumps heat ($T_2$-$T_3$). Stated differently, $M_1$ is employed as a chemical pressure pump to provide hydrogen at relatively high pressure $P_1$ during one part of the cycle and to draw hydrogen at lower pressure $P_2$ during the other part of the cycle. Bed $M_2$ responds to the relatively high pressure hydrogen as a chemical heat pump by giving off heat at $T_2$, and then draws heat at $T_3$ when hydrogen is drawn off at the lower pressure $P_2$.

The unexpected result of freeing, in principle, the dynamic range of the heat pump portion of the cycle from dependency upon the operating temperatures of the pressure pump portion of the cycle has important implications concerning the application of this invention. For example, $M_1$ can be niobium metal and $M_2$ can be chosen to be a magnesium nickel alloy ($Mg_2Ni$). With these choices, the niobium bed can be cycled between 75° F. and 300° F., thereby providing hydrogen around 80 atmospheres and drawing hydrogen at about 0.70 atmospheres. This would result in the magnesium-nickel bed desorbing hydrogen at about 0.7 atmospheres at approximately 460° F. The end result of this cycle is the delivery of thermal energy, without the benefit of mechanical assistance or external work being done on the system, at over 800+ F., where the only other thermal reservoirs are at approximately 75° F., 300° F., and 460° F. Similarly, cyrogenic heat pumping, or refrigeration, can be accomplished without mechanical assist. By again cycling niobium between 75° F. and 300° F. to pump hydrogen from about 0.70 atmospheres to over 80 atmospheres, and employing a cerium enriched mischmetal-nickel alloy (where mischmetal is a commercial mixture of metals) heat can be pumped from around −20° F. to over 100° F.

Pressure Ladder

Figure 4:
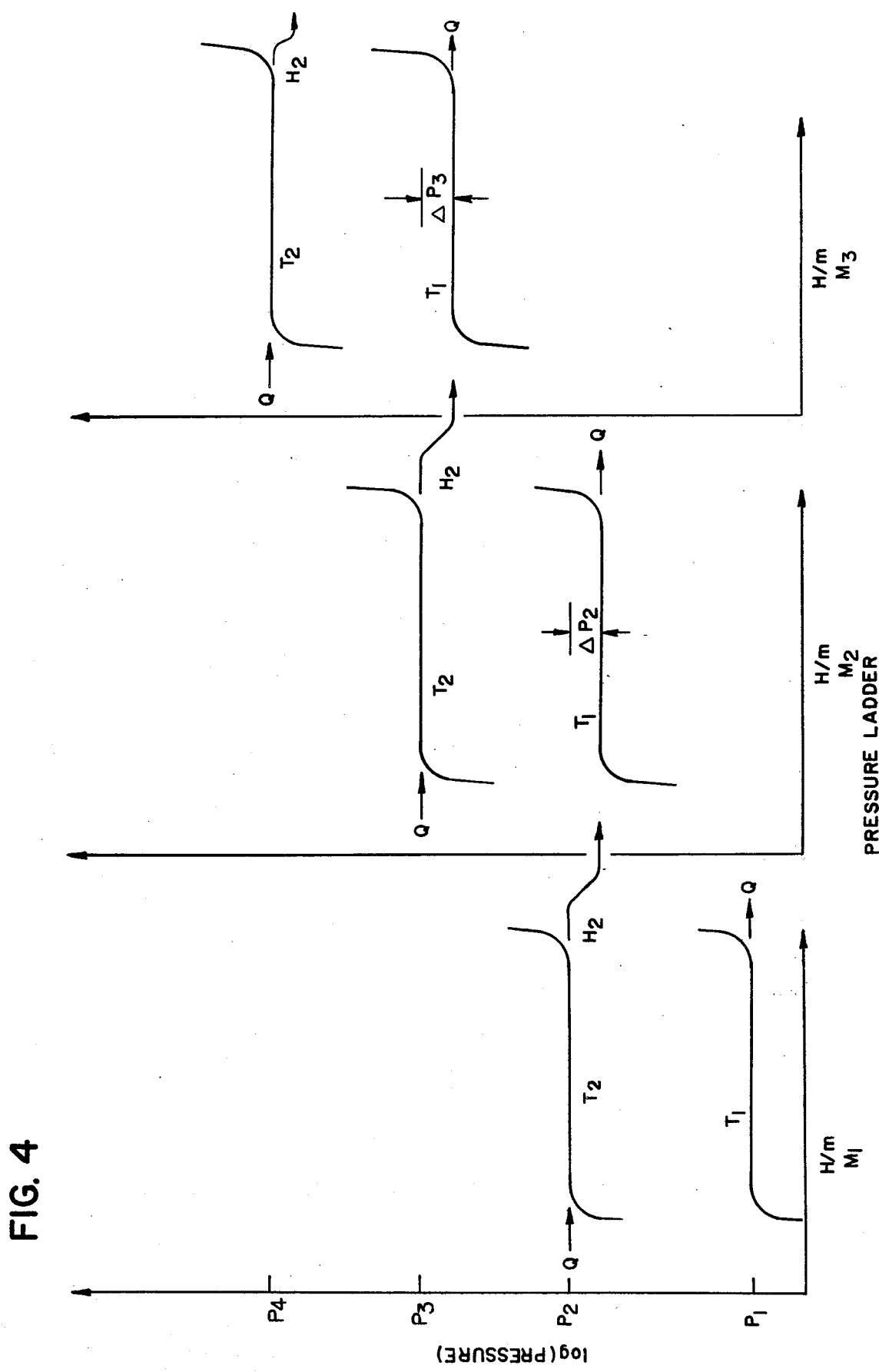
FIG. 4 is a schematic pressure-composition diagram for a typical ladder of hydride cycles to generate high pressure hydrogen pumping.

Once it is understood that the first portion of the cycle is primarily for the purpose of using hydrides to furnish relatively high pressure hydrogen gas as input to the second half of the cycle, without mechanical pumping, then it can also be recognized that the function of $M_1$ can be performed by more than one hydride-dehydride reactor in a progression to achieve a larger dynamic range of pressure. Typical absorption curves for such a progression or "pressure ladder" are shown in FIG. 4. Such a pressure ladder could employ only two heat reservoirs to chemically compress hydrogen from low pressures to extremely high pressures in a sequence of hydride cycles employing a number of different hydrides and reactors. For purposes of illustration in FIG. 4 the absorption curves for the different hydrides are placed side by side in sequence, and they all share a common pressure axis to demonstrate the resulting pressure increase. It should also be noted that each hydride species in the sequence can be cycled between the same temperatures: $T_1$ and $T_2$.

Each hydride in the reactors of the "pressure ladder" of FIG. 4 can be initially in a relatively hydrogen-free state. Hydrogen gas is then supplied to $M_1$ at a pressure $P_1$. The $M_1$ hydride bed is then brought to a temperature $T_1$ at which it will absorb the hydrogen—$P_1$ and $T_1$ being characteristic of the particular hydride species employed. Once substantially hydrided, the $M_1$ bed is heated to $T_2$ and the hydrogen is desorbed at a higher pressure $P_2$ and allowed to come into contact with hydride $M_2$ in the next reactor. The second hydride is different than $M_1$ and is selected such that a temperature $T_1$, the bed will exothermically absorb hydrogen at a pressure of $P_2$. Typically, although it is not necessary to the cycle, $M_2$ should be selected such that it absorbs at a pressure slightly lower than $P_2$ ($P_2-\Delta P_2$). Thus, bed $M_1$ supplies hydrogen at a pressure slightly higher than the minimum necessary to promote absorption by bed $M_2$ at temperature $T_1$—thus insuring either nearly full dehydridization of bed $M_1$ or almost complete saturation of $M_2$. When this condition is reached, bed $M_2$ is then heated to $T_2$, resulting in the release of hydrogen at pressure $P_3$. In this manner, two heat reservoirs at temperatures of $T_1$ and $T_2$, and two selected hydride species can be utilized to chemically compress hydrogen from pressure $P_1$ to $P_3$, as shown in FIG. 4.

To use specific examples in FIG. 4, if $M_1$ is niobium, $M_2$ is iron-titanium, $T_1$ is 100° F., and $T_2$ is 175° F., then hydrogen inputted at a pressure $P_1$ of about 1 atmospheres can be compressed to a pressure $P_2$ of over 8 atmospheres by bed $M_1$ and up to a pressure $P_3$ of over 20 atmospheres by bed $M_2$. The one feature each hydride species in the "ladder" shares is that temperature $T_2$ must be above the decomposition temperature of the hydride at the upper end of the pressure range over which the particular hydride bed is cycled.

To continue the "ladder," a third reactor and an additional hydride bed, $M_3$, may be added to further compress the hydrogen. The bed $M_3$ is selected to absorb hydrogen when at temperature $T_1$ at a pressure just below the pressure supplied by bed $M_2$ ($P_3-\Delta P_3$) and desorb at pressure $P_4$ when heated to $T_2$. In like manner, more reactors and beds can be added to reach almost any desired hydrogen pressure—the only limitations arising, in principle, from the mechanical and structural limitations of the apparatus in high pressure environments.

In practice, such a chemical pressure pump, or "pressure ladder" may consist of a progression of hydride-dehydride reactors; each containing one or more species of hydride. In addition, each reactor may be connected to one or more other reactors by some means to allow transfer of the hydrogen gas from reactor to reactor, and be equipped with a means to heat and cool the hydrides to selected temperatures. It should be noted that such a collection of reactors may be connected in a combination of series or parallel arrangements to achieve a specific desired pressure and volume.

Temperature Ladder

The heat pumping function of $M_2$ in FIG. 3 can similarly be performed by a progression of hydride beds thermally linked to provide a larger dynamic range of temperatures. This can be achieved with a "temperature ladder" depicted in FIG. 5 analogous to the "pressure ladder" of FIG. 4. For purposes of illustration in FIG. 5 the absorption curves for the different hydrides are placed side by side in sequence, and in this case, they all share a common temperature axis to demonstrate the resulting temperature increase. Analogous to the pressure ladder, it should be noted that each hydride species in the sequence may be cycled between the same pressures: $P_1$ and $P_2$. Accordingly, instead of isotherms as in FIG. 4, the graphs of FIG. 5 are isobars, representing the hydride temperature-composition curves for constant pressure conditions.

Figure 5:
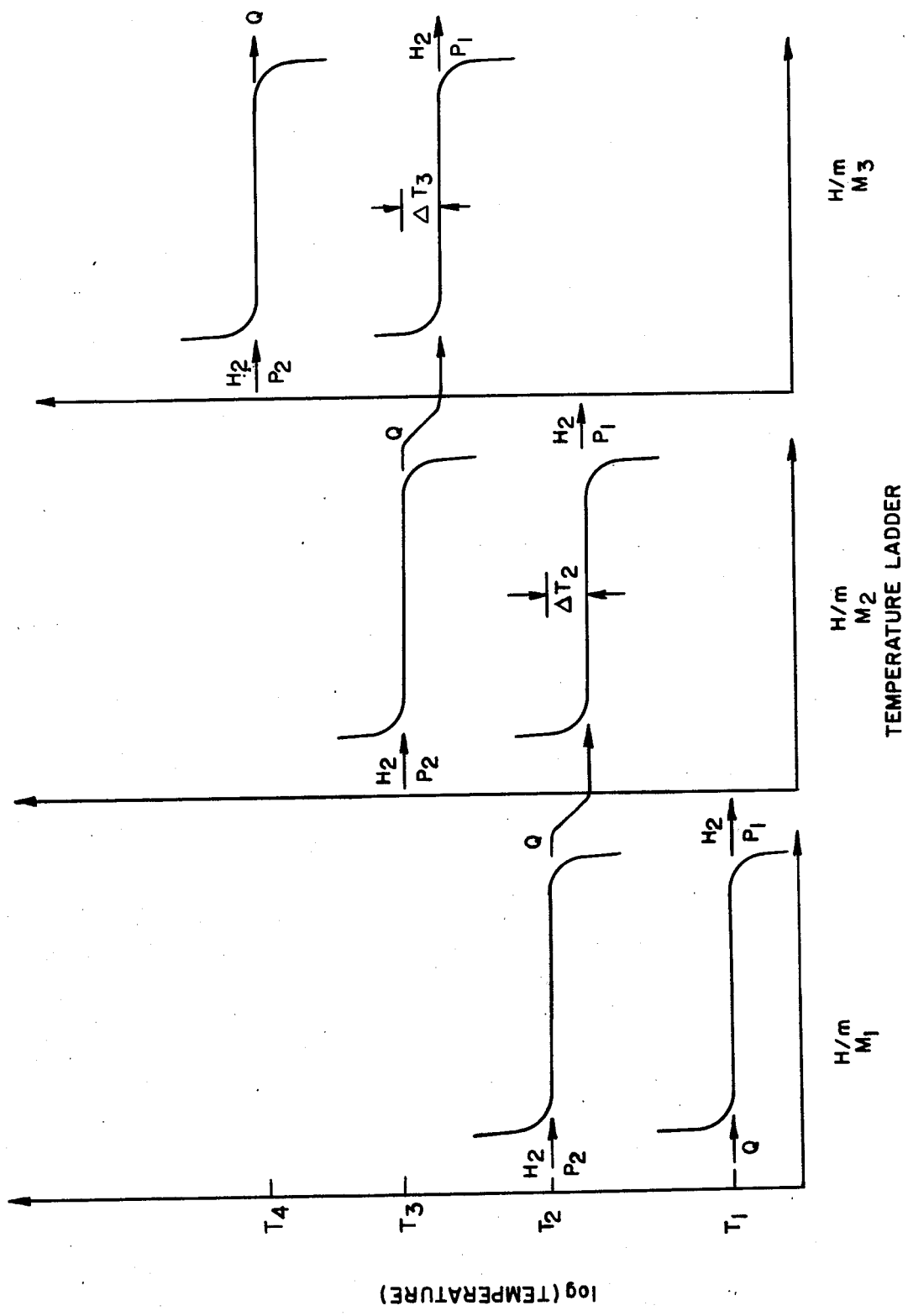
FIG. 5 is a schematic temperature-composition diagram for a typical ladder of hydride cycles to generate high temperature heat pumping.

Each hydride bed in FIG. 5 is initially as fully hydrided as practicable. Heat is then supplied to $M_1$ at a temperature above the decomposition temperature $T_1$ of the hydride for pressure $P_1$. Hydrogen is driven off at pressure $P_1$ until the bed is as fully dehydrided as practicable. Upon depletion of bed $M_1$, the heat source at $T_1$ is removed and a thermal link between bed $M_1$ and bed $M_2$ is established. Hydrogen at pressure $P_2$ is brought in contact with bed $M_1$. $M_1$ has been chosen such that it will exothermically absorb hydrogen at pressure $P_2$ and release heat at temperature $T_2$—where $P_2$ and $T_2$ are characteristic of the particular hydride species $M_1$. The heat liberated by $M_1$ as it absorbs hydrogen is conducted to hydride bed $M_2$. $M_2$ has been chosen such that it possesses a decomposition temperature, in the preferred embodiment, somewhat below $T_2$. The decomposition temperature of $M_2$ for hydrogen at pressure $P_1$ is thus preferably $(T_2-\Delta T_2)$, although it may be as high as $T_2$. An appropriately chosen $M_2$ hydride will therefore begin to liberate hydrogen at pressure $P_1$ when supplied with the heat at $T_2$ from the previous hydride bed $M_1$. When $M_2$ is nearly depleted, or alternatively, when $M_1$ is nearly saturated and stops heating $M_2$, the thermal connection between $M_1$ and $M_2$ is broken. A thermal contact between beds $M_2$ and $M_3$ is then established and $M_2$ is placed in contact with hydrogen at $P_2$. As before, $M_2$ will begin to absorb the high pressure hydrogen and supply heat at $T_3$—where $T_3$ is characteristic of the hydride $M_2$ when absorbing at pressure $P_2$. Due to the thermal contact, bed $M_3$ is heated to temperature $T_3$. If $M_3$ is properly chosen, its decomposition temperature for hydrogen at $P_1$ will be slightly less than $T_3$ or $(T_3-\Delta T_3)$ and will begin to liberate hydrogen at pressure $P_1$.

It can be seen that this progression may be continued resulting in heat pumping from $T_1$ to elevated temperatures $T_2$, $T_3$, $T_4$, etc., by the use of a string of additional appropriate hydrides and reactors. The main criteria for hydride selection is that the material chosen must exothermically absorb hydrogen supplied above $P_2$, desorb hydrogen drawn below $P_1$, and possess decomposition temperatures less than or equal to the temperature at which the previous hydride in the series delivers heat when absorbing. While this description of FIG. 5 has, for clarity, presumed that each hydride bed operates between the same pressures ($P_1$ and $P_2$) this is not necessary to operation.

To use specific parameters in FIG. 5: $M_1$ can be niobium; $M_2$ can be a magnesium-nickel alloy ($Mg_2Ni$); $P_1$ can be 0.1 atmospheres; and $P_2$ can be 250 atmospheres. With these choices, $M_1$ will liberate 0.1 atmospheres hydrogen at a temperature $T_1$ around 19° F., and absorb 250 atmosphere hydrogen while supplying heat at a temperature $T_2$ around 380° F. The second bed $M_2$ will be heated by the 380° F. source and will begin to liberate 0.1 atmosphere hydrogen near 350° F. When depleted, $M_2$ will absorb 250 atmosphere hydrogen while delivering heat around 105° F. Thus, using a 250 atmosphere hydrogen source, a mechanism for drawing off hydrogen at 0.1 atmospheres, and a heat source at 19° F., heat can be pumped in principle, from around 19° F. to over 1000° F. employing only the first two beds in a potentially larger series. In addition, a "pressure ladder" can be employed to draw off the 0.1 atmosphere hydrogen as input to the ladder while the same ladder may deliver, as its output, the 250 atmosphere hydrogen required to drive each bed in the "temperature ladder."

In this way, high pressure hydrogen at $P_2$ is used to exothermically hydride the first bed, thereby heating the second bed in the sequence; low pressure hydrogen at $P_1$ is drawn from this second bed as it is further heated; upon depletion, the second bed is exposed to high pressure hydrogen at $P_2$. The cycle continues with each bed being heated, dehydriding at $P_1$, hydriding at $P_2$, and heating the next bed. One pressure ladder may function to both draw and supply the hydrogen at the required pressures; and this may be true even when each bed in the temperature ladder operates between different pairs of pressures. Such linking of hydride "ladders", wherein intermediate beds in the pressure ladder may supply and draw hydrogen from a variety of intermediate beds in the temperature ladder, can result in very large pressure and temperature ranges without mechanical pumping.

It should be noted that all of the composition curves in FIGS. 1, 3, 4, and 5 represent the behavior of somewhat idealized hydrides. In actuality, the composition isotherms for a particular useful hydride may not display a completely "flat" plateau region of constant pressure over a wide range of H/m values. Such deviations from completely isobaric behavior for some range of H/m will affect the overall efficiency of the hydride system. The preferred hydrides are those possessing isotherms with a large substantially isobaric region. Hydrides with smaller plateaus, or slightly non-isobaric regions may also be used, however.

In addition, the composition curves of FIGS. 1, 3, 4, and 5 are also idealized in the respect that hysteresis effects have been ignored. A typical depiction of hysteresis effects in a metal hydride system is shown in FIG.

Figure 6:
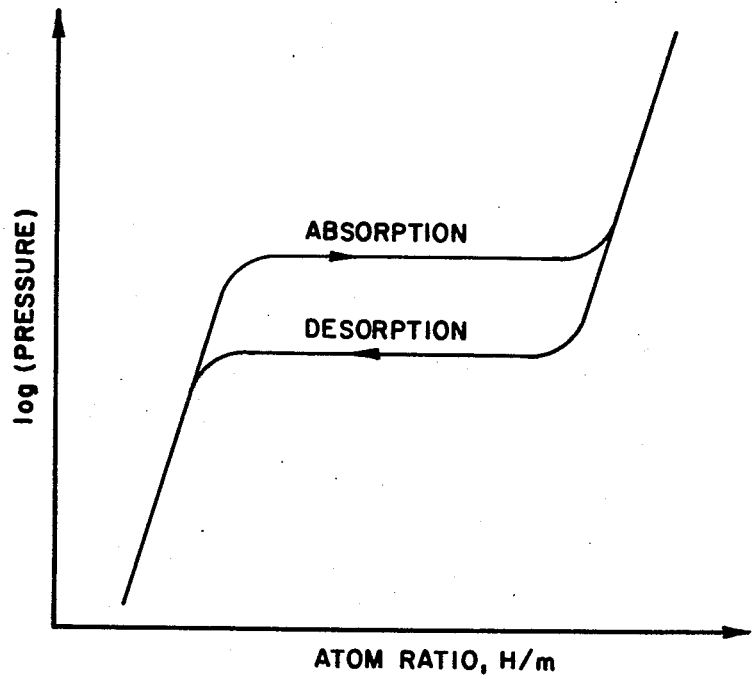
FIG. 6 is a pressure-composition diagram showing typical hysteresis effects.

6. It can be seen from FIG. 6 that, for a given temperature, absorption will take place only at a pressure higher than the pressure at which desorption will occur. This effect may detract from the overall efficiency of the heatpump and necessitate either raising the desorption temperature or lowering the absorption pressure. The resulting efficiency loss from this source can be kept small by careful selection and formulation of the metal or alloy to be employed. Some hydrides demonstrate marked hysteresis effects while in others the effects are almost negligible. To maintain the same overall pressure/temperature values, some compensation may be made for hysteresis effects in both the pressure and temperature ladders by increasing the $\Delta P$ and $\Delta T$ quantities noted in FIG. 4 and FIG. 5, respectively. In addition, it has been observed that hysteresis may be somewhat dependent upon temperature and a particular hydride will demonstrate different hysteresis effects at different temperatures. Hydrides should therefore be selected for a particular application.

It has also been observed that repeated hydriding and dehydriding of a bed results in a certain reduction in the hydride's ability to take up and give off heat. This generally occurs when the metal particles have begun to break up and become progressively smaller after repeated cycles. This particle size reduction is thought to be caused by one metal lattice site hydriding while an adjacent lattice site remains dehydrided. Such differential hydriding may strain the lattice and result in particle break-up. While this probably cannot be completely prevented, the net effect may be diminished by using beds with larger surface area or periodically replenishing the beds.

As the behavior of the hydridable materials is largely dependent upon the degree of physical contact between the hydrogen gas and the hydride, one would expect the rate at which a given cycle operates to be somewhat dependent upon the surface area available for contact with the gas. The kinetics of the overall cycle would therefore be affected by the effective contact between the material and the hydrogen. In general, increasing the available surface contact area should favorably affect the kinetics of a given cycle. Some experimentation will be necessary, however, to determine the optimum size, shape, configuration, or granulation necessary to achieve a desired kinetic state for a particular hydride. In addition, mixing of more than one hydride species in a single bed or supporting a hydride on various inert or active substrates may result in improved kinetic characteristics. It is understood that those skilled in the art will be capable of empirically ascertaining the particular arrangement most useful for a particular set of temperature-pressure conditions and kinetic goals.

The hydride heat pump as disclosed herein will deliver heat from one heat reservoir to a reservoir at a higher temperature. Among the advantages that it exhibits over the art are high efficiency, ability to use low temperature heat, reduction of moving parts, large dynamic thermal range of operation, independence from the temperature range over which the hydrogen compression may occur, silient operation, and a mechanically very simple cycle.

Although certain preferred embodiments of the invention have been herein described in order to illustrate the principles of the invention, it will be understood that various changes and innovations in the illustrated and described embodiments can be effected without departure from the basic principles of the invention. To those skilled in the art to which this invention relates many changes in construction, embodiments, and applications of the invention will suggest themselves without departing from the spirit and scope of the invention. The descriptions herein are purely illustrative and are not intended to be in any sense limiting.

I claim:

1. A method for transferring heat energy between two different temperatures comprising:

chemically forming and decomposing hydrides by reaction of hydrideable materials with hydrogen gas in a plurality of hydride-dehydride reactor means, said plurality comprising first and second reactor means with said first and second reactor means comprising first and second hydrideable materials, respectively, wherein said first and second hydrideable materials are of dissimilar compositions;

supplying heat at temperatures $T_1$ to said first reactor means to promote the decomposition of said hydrided materials in said first reactor means and liberate hydrogen gas;

allowing hydrogen gas to transfer between said first and second reactor means;

removing heat at temperature $T_2$ from said second reactor means as said hydrideable materials contained therein exothermically absorb said hydrogen gas liberated by said first reactor means;

supplying heat at temperature $T_3$ to said second reactor means to promote the decomposition of said hydrided materials in said second reactor means to liberate said absorbed hydrogen gas; and removing heat at $T_4$ from said first reactor means as said hydrideable materials contained therein exothermically absorb said hydrogen gas liberated by said second reactor means, wherein the temperature range over which said second reactor means operates, $T_3$ to $T_2$, is different from and independent of the temperature range over which said first reactor means operates, $T_1$ to $T_4$, and said first reactor means and said second reactor means liberate hydrogen at different pressures.

2. The method of claim 1 wherein the output temperature $T_2$ is greater than $T_1$, $T_3$, and $T_4$.

3. The method of claim 1 wherein temperature $T_3$ is less than $T_1$, $T_2$ and $T_4$.

4. The method of claims 2 or 3 wherein the transfer of hydrogen gas between said first and second reactor means is achieved substantially without mechanical assistance.

5. The method of claim 4 wherein said second reactor means comprises a plurality of hydride-dehydride reactor means arranged as a temperature ladder which pumps heat from about temperature $T_3$ up to about temperature $T_2$, wherein at least two of said hydride-dehydride means contain dissimilar hydrideable material compositions.

6. The method of claim 5 wherein said first reactor means comprises a plurality of hydride-dehydride reactor means arranged as a pressure ladder in which each of said hydride-dehydride reactor means operates between about temperatures $T_1$ and $T_4$, and wherein at least two of said hydride-dehydride reactor means contains dissimilar hydrideable material compositions.

7. The method of claim 6 wherein said pressure ladder draws hydrogen from said temperature ladder at about pressure $P_6$ and supplies hydrogen to said temperature ladder at about pressure $P_a$, and $P_a$ is greater than $P_b$.

8. The method of claim 7 wherein each of said hydride-dehydride reactor means comprising said temperature ladder operates between about pressures $P_a$ and $P_b$.

* * * * *

UNITED STATES PATENT OFFICE
CERTIFICATE OF CORRECTION

Patent No. 4,200,144      Dated April 29, 1980

Inventor(s)     Bruce E. Sirovich

It is certified that error appears in the above-identified patent and that said Letters Patent are hereby corrected as shown below:

| Patent Column | Line | |
|---|---|---|
| 2 | 58 | "$(T_c > T_d,$" should read --$(T_c < T_d,$--. |
| 4 | 40 | "FIG. 3. absorbs hydrogen" should read --FIG. 3. The second metal hydride bed $M_2$ was selected by virtue of the fact that it possesses absorption characteristics wherein $M_2$ exothermically absorbs hydrogen--. |
| 5 | 56 | *"$(Mg_2N_i)$" should read --$(Mg_2Ni)$--. |
| 8 | 17 | *"$(Mg_2N_i)$" should read --$(Mg_2Ni)$--. |
| 10 | 61 | "$P_6$" should read --$P_b$--. |

Signed and Sealed this

Nineteenth Day of August 1980

[SEAL]

Attest:

SIDNEY A. DIAMOND

Attesting Officer     Commissioner of Patents and Trademarks